United States Patent [19]

Tanaka et al.

[11] 4,325,710
[45] Apr. 20, 1982

[54] SINTERED CERAMICS FOR CUTTING TOOLS AND MANUFACTURING PROCESS THEREOF

[75] Inventors: Hiroshi Tanaka; Yoshihiro Yamamoto, both of Iwakura, Japan

[73] Assignee: NGK Spark Plug Co., Ltd., Nagoya, Japan

[21] Appl. No.: 129,318

[22] Filed: Mar. 11, 1980

[30] Foreign Application Priority Data

Mar. 19, 1979 [JP] Japan .................................. 54-33050

[51] Int. Cl.³ .................. B24D 3/16; C04B 35/10; C04B 35/52; C04B 35/58
[52] U.S. Cl. ........................................ 51/309; 75/205; 75/206; 75/225; 264/65; 501/87; 501/96; 501/102; 501/103; 501/104; 501/105; 501/127; 501/152; 501/153
[58] Field of Search ................ 106/43, 57, 73.33, 73.2, 106/73.4; 75/225, 206; 264/65; 51/309; 501/87, 96, 102, 103, 104, 105, 127, 152

[56] References Cited

U.S. PATENT DOCUMENTS

| | | | |
|---|---|---|---|
| 3,669,695 | 6/1972 | Iler et al. ................. | 106/43 |
| 4,022,584 | 5/1977 | Rudy ......................... | 106/73.33 |
| 4,217,113 | 8/1980 | Suh et al. ................... | 51/309 |
| 4,218,253 | 8/1980 | Dworak et al. ............. | 106/43 |
| 4,227,842 | 10/1980 | Samanta et al. ............ | 51/309 |
| 4,249,914 | 2/1981 | Ogawa et al. .............. | 51/309 |

FOREIGN PATENT DOCUMENTS

| | | | |
|---|---|---|---|
| 641647 | 5/1962 | Canada ................................... | 264/65 |
| 1048530 | 1/1959 | Fed. Rep. of Germany ........ | 106/57 |
| 50-89410 | 7/1975 | Japan ................................. | 106/73.4 |

OTHER PUBLICATIONS

Claussen, N., "Fracture Toughness of $Al_2O_3$ with an Unstabilized $ZrO_2$ Dispersed Phase", J. Am. Cer. Soc. 59 (1976) pp. 49–51.
Claussen, N. et al., "Toughening of Ceramic Composites by Oriented Nucleation of Microcracks", J. Am. Cer. Soc. 59 (1976) pp. 457–458.
Chem.Abstracts–vol. 91 (1979) items 197773n and 111606a.

*Primary Examiner*—Helen M. McCarthy
*Attorney, Agent, or Firm*—Wegner & Bretschneider

[57] ABSTRACT

A sintered ceramics for cutting tools having a relative apparent density of not less than 98% is obtained by sintering a mixture substantially consisting of 80–95% by volume alumina and the balance of titanium nitride and Zr-containing component(s) such as Zr, ZrC and-/or ZrN wherein the volumetric ratio of TiN /Zr-containing component(s) ranges 95/5–50/50 in vacuum and/or vacuum inert atmosphere. Although the present invention does not need any application of hot pressing or HIP process, the resultant ceramics has an improved abrasion resistance comparable to those obtained by the latter processes.

30 Claims, 1 Drawing Figure

SINTERED CERAMICS FOR CUTTING TOOLS AND MANUFACTURING PROCESS THEREOF

BACKGROUND

The present invention relates to a sintered ceramics and a manufacturing process thereof, particularly, to a sintered ceramics of alumina-titanium nitride ($Al_2O_3$-TiN) type which has conventionally been produced by pressing at a high temperature such as hot pressing- or HIP process, now according to the present invention being capable of being produced by a powder metallurgical process at a low cost.

It has been known that the $Al_2O_3$-TiN type ceramic tools obtained by sintering a mixture of 5–40% by volume of TiN and the balance of $Al_2O_3$ by the hot pressing process or by the hot isostatic pressing process (HIP process) show a very high resistance to oxidation and crater formation thus that those are outstanding as cutting tools (Japanese Patent Application Open-laying No. 50-89410). However, the hot pressing process is not suitable for mass production since a ceramic plate thereby is pressformed, sintered in a graphite die then being cut and machined by diamond grinding wheel, resulting in a high cost for the commercial production. On the other hand, it is necessary for the HIP process to use gas (usually argon) as a pressure medium, thus the HIP sintering must be applied either after coating of the surface of the body to be sintered or after a presintering step up to a relative density of not less than about 95% of the theoretical density, which makes this process difficult to be applied commercially.

Accordingly, the object of the present invention is to provide a novel sintered ceramics and a novel manufacturing process thereof which can eliminate the drawbacks of the prior art.

A further object of the present invention is to provide a novel sintered ceramics which can be sintered without applying the hot pressing or the HIP process and a novel manufacturing process thereof.

A still further object of the present invention is to provide a novel sintered ceramics which can be produced at a low cost and is suitable for the commercial mass production and a manufacturing process thereof.

BRIEF SUMMARY OF THE INVENTION

The present invention is based on the inventor's finding after their eager investigations that a novel $Al_2O_3$-TiN type of ceramics can be produced by adding a specified part of zirconium-containing component(s) such as zirconium (Zr), zircon carbide (ZrC) and/or zircon nitride (ZrN) to the $Al_2O_3$-TiN base component, which novel ceramics can be sintered and commercially mass produced in a vacuum furnace by generally applying a conventional powder metallurgical manner.

The present invention provides a sintered ceramics for cutting tools obtained by sintering a mixture substantially consisting of 80–95% by volume of alumina and the balance of titanium nitride and one or more zirconium-containing components selected from the group consisting of zirconium, zirconium carbide and zirconium nitride, wherein the volumetric ratio of titanium nitride/zirconium-containing component(s) ranges between 95/5 and 50/50, inclusively.

The present invention further provides an improvement in a manufacturing process of said new sintered ceramics comprising: that the starting mixture substantially consists of 80–95% by volume of alumina and the balance of titanium nitride and one or more zirconium-containing components selected from a group consisting of zirconium, zirconium carbide and zirconium nitride wherein the volumetric ratio of titanium nitride/zirconium-containing component(s) ranges between 95/5 and 50/50, inclusively, and that the pressed body is sintered in the vacuum and/or in the vacuum inert atmosphere.

Figure 1:
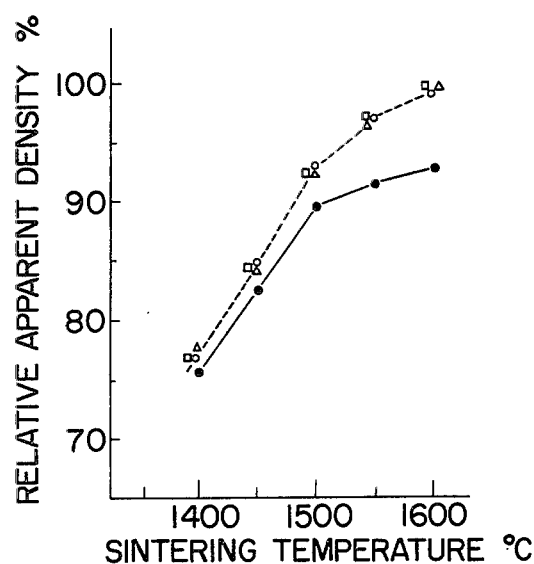
FIG. 1 shows a graph demonstrating the effect of incorporation of the Zr-containing component(s) upon the relative apparent density of the sintered mass according to the different sintering temperatures as disclosed in Example 1. The symbols in the graph represents following modes.

o ... ceramics to which ZrC was added
△ ... ceramics to which Zr was added
□ ... ceramics to which ZrN was added
● ... ceramics comprising no Zr-containing component.

DETAILED DESCRIPTION OF THE INVENTION

In the present invention, the starting mixture substantially consists of 80–95% by volume of $Al_2O_3$ and the balance of TiN and one or more Zr-containing conponents selected from the group consisting of Zr, ZrC and ZrN, wherein the TiN/Zr-containing component(s) ratio ranges between approximately 95/5 and 50/50, inclusively.

As the starting $Al_2O_3$, $\alpha$-$Al_2O_3$ having a purity not less than about 99.9% by weight and a mean particle size of not exceeding about $1\mu$ may be used. Such $\alpha$-$Al_2O_3$ is preferably obtained by decomposing aluminum-containing salts or organic materials then calcinating the resultant substances rather than by Bayer process.

As the starting TiN, TiN comprising not less than about 75% by weight of Ti and not less than about 20% by weight of N and having a mean particle size of not exceeding about $3\mu$ can be used. As one of such starting TiN, that obtained by nitriding sponge titanium in the nitrogen gas flow may be exemplified, while the manner for preparation of TiN is not limited thereto.

As the starting ZrC, ZrC comprising not less than about 11.3% by weight and having a mean particle size of not exceeding about $3\mu$ can be employed.

As the starting ZrN, ZrN comprising not less than about 13.0% by weight of N and having a mean particle size of not exceeding about $5\mu$ can be used.

As the starting Zr, Zr having a purity of not less than about 98% by weight and a mean particle size of not exceeding about $6\mu$ may be used.

For all the starting materials other than $Al_2O_3$ a mean particle size of not exceeding $2\mu$ is preferred. However, such particle sizes as aforementioned are not strictly limited thereto because mixing in the ball mill serves also as a milling step.

According to the present invention, 80–95% by volume of $Al_2O_3$ is comprised in the sintered ceramics on the following reasons:

a. A lower incorporation of $Al_2O_3$ than 80% by volume would cause a poor sintering property, which results in a relatively fine grain size of sintered body, however, accompanied with separation and dropping-off of the grain particles from the sintered body upon cutting, thus bringing to a large abrasion of the cutting tools.

b. At a higher percent of Al₂O₃ than 95% by volume, the crystal grain growth of Al₂O₃ occurs thus causing a large abrasion upon use.

The volumetric ratio of TiN/Zr-containing component(s), i.e., a ratio of TiN/sum of Zr, ZrC and ZrN ranges 95/5–50/50. At a smaller ratio than 50/50, a poor sintering property is observed. At a higher ratio than 95/5, the effective features for incorporation of the Zr-containing component(s) are not realized enough.

In the present invention, the term "% by volume" represents a ratio based on the theoretical volume of each component.

The starting materials are mixed together throughly in a predetermined ratio therebetween, then organic binder and optionally diluent are further admixed thereto for compaction or pressing aid. The organic binder will be burned-off or evaporated during the initial course of sintering, i.e. during the heat-up course. Any known organic binder satisfying this requirement may be used. The diluent serves to decreasing and controlling the viscosity of the binder, and may be volatile organic solvent or the like. Preferably, around a few percents of camphor diluted with about 10 times by volume of ether is admixed to the starting material mixture.

Then the resultant mixture is pressed into a pressed body by known manner, consequently being brought into a vacuum furnace for sintering. The sintering procedure is carried out at a temperature approximately ranging 1500°–1700° C., preferably 1550°–1650° C. in the vacuum and/or vacuum inert atmosphere. At a temperature under 1550° C., sintering might be incomplete and caution thereto should be taken into account. At a higher temperature than 1650° C., alumina tends to undesirable grain growth, which grain growth would lead the resultant physical and cutting properties to deteriorate. Thus the upper limit for the sintering temperature is set at about 1700° C. The sintering is carried out in the vacuum and/or vacuum inert atmosphere because TiN, Zr, ZrC and ZrN are very likely to oxidize.

The terms "vacuum" and "vacuum inert atmosphere" for sintering conditions are meant as follows: The sintering can be carried out in the vacuum furnace under a vacuum of not exceeding about $1\times10^{-1}$ Torr, preferably approximately $1\times10^{-2}-1\times10^{-3}$ Torr. The pressed body can also be sintered in a vacuum inert atmosphere of which inert gas pressure approximately ranges not exceeding 200 Torr, preferably approximately 50–100 Torr. Within the inert atmosphere, those substantially consisting of inert gas, preferably Ar, He or a mixture thereof fall.

Besides above two sintering modes, a two step mode of sintering can be employed, i.e., the first step being heating up to about 1300°–1350° C. in the vacuum as defined hereinabove, the second step being sintering at a higher temperature up to 1700° C., preferably within a temperature of 1550°–1650° C., in the vacuum inert atmosphere as prescribed hereinbefore.

The outcoming sintered ceramics according to the process aforementioned achieves a relative apparent density of not less than 98% by volume based on the theoretical density of the sintered body, which relative theoretical density Al₂O₃-TiN-Zr-containing component(s) type ceramics is calculated by the following equation:

$$d = \frac{a+b+c}{\frac{a}{\rho a} + \frac{b}{\rho b} + \frac{c}{\rho c}} \quad (1)$$

$$\frac{d'}{d} = \frac{\left(\frac{a}{\rho a} + \frac{b}{\rho b} + \frac{c}{\rho c}\right) d'}{a+b+c} \times 100 \quad (2)$$

wherein representing; d: theoretical density, d': apparent density measured (including interiorly incorporated pores), a,b,c: % by weight for Al₂O₃, TiN or Zr-containing components, respectively, and $\rho_a$, $\rho_b$, $\rho_c$: theoretical density of Al₂O₃, TiN or Zr-containing component(s), respectively.

The effect of incorporation of the Zr-containing component(s) appears by adding 1% by volume of such component(s) solely or as a mixture, i.e., the relative apparent density remarkably increases thereby (vid. FIG. 1). It is construed that such feature can be realized by following reasons:

(1) Zr-containing component(s), i.e., Zr, ZrC and ZrN partly changes into zircon oxide which improves the sintering.

(2) Zr, ZrC and ZrN would form lower oxide of Zr such as ZrO and intermediate reaction products with oxide such as Al₂O₃ and occasionally TiO which has been formed from TiN by its partial decomposition during the sintering. Those reaction products would improve the bonding strength between Al₂O₃ and TiN.

Without such incorporation of the Zr-containing component(s), a rapid grain growth of alumina is observed, which grain growth closes pores in the sintering body and brings no further increase in the density even if the sintering temperature would further be elevated.

In the present invention, the starting materials as aforementioned permit a further incorporation of one or more oxides selected from the group consisting of 0–1.0% of MgO, 0–0.6% of CaO and 0–0.6% of Y₂O₃, all by volume % which are known as common sintering agents for alumina.

Accordingly, the present invention has realized a novel sintered ceramics capable of being massproduced in a commercially large scale at a low cost by incorporating and partly replacing some part of TiN with Zr-containing component(s) such as Zr, ZrC and/or ZrN. According to the prior art such Al₂O₃-TiN ceramic tools have been available only by hot pressing- or HIP process.

EXAMPLES

Following examples are disclosed for a better illustration of the present invention and not for limitation thereof. without aparting from the gist of the present invention any variation or modification may be adopted on the basis of the features of the present invention as disclosed hereinbefore as well as hereinbelow.

EXAMPLE 1

90% by volume of commercially available α-Al₂O₃ powder having a purity of 99.9% by weight and a mean particle size of 0.5μ, 9% by volume of commercial TiN (N 22 wt%) having a mean particle size of 1μ and 1% by volume of commercial Zr (Zr 98.5 wt%), ZrC (C 11.4 wt%) or ZrN (N 14 wt%), alternatively, and having a mean grain size of 5.5μ, 1.5μ or 2.5μ, respectively, were mixed and milled throughly in a stainless steel ball mill charged with cemented carbide balls and alcohol for 40 hours. From the resultant slurry, alcohol was evaporated, then 2% by weight of camphor diluted with 10 times by volume of ether was admixed thereto. The resultant mixture was then pressed into pressed pieces using a metallic die which permits a final dimension of 14×14×5 mm after sintering under application of a pressure of 1 ton/cm$^2$. The pressed pieces were then heated up to 400° C. to remove camphor, brought into a vacuum furnace (equipped with a graphite heater) then sintered at a temperature 1400°-1600° C. for 1 hour in the argon gas flow at a vacuum pressure of 100 Torr. The relative apparent density was measured at each sintered sample piece at each different sintering temperature, the results being plotted in FIG. 1. The symbol o, Δ or □ represents the sample piece incorporated with ZrC, Zr or ZrN, respectively, whereas the symbol ● represents samples having no incorporation of such components.

EXAMPLE 2

1% in total by volume of two or three of ZrC, Zr and ZrN based on the sintered piece were admixed to the same base component of Al$_2$O$_3$ and TiN as disclosed in Example 1. The sample pieces were prepared and measured in the same manner as in Example 1. The results proved almost the same features as in Example 1, i.e. for sole incorporation of such Zr-containing components.

EXAMPLE 3

Commercially available powder of α-Al$_2$O$_3$, TiN, ZrC, Zr and ZrN which are the same as in Example 1 were weighed and mixed in a predetermined ratio according to the Table 1, pressed, the camphor being removed in the same manner as in Example 1 then sintered at 1550° C. for 2 hours under the same atmosphere and pressure conditions as in Example 1. After the sintering, the sintered pieces were machined into a square cutting tip having a dimension of 12.7×12.7×4.8 mm, nose radius of 0.8 mm and chamfering of 25°×0.08 mm. The prepared sample tips were tested with their physical and cutting properties, the results being demonstrated in Table 1.

As demonstrated in FIG. 1, each sample No. 1-7 falling within the claimed scope of the present invention exhibits a remarkably superior property and cutting life to those samples No. 8-11 which deviate from the scope of the present invention in any one component. The samples No. 1-7 further proved a distinguished long cutting life in comparison with samples No. 14-15 which were obtained by hot pressing of the known Al$_2$O$_3$-TiN type components.

TABLE 1.

| Sample No. | Starting components % by vol. | | | | | Relative apparent density (%) | Hardness 45N | Mean grain size (μ) | Flank abrasion*[1] mm | Remarks |
| --- | --- | --- | --- | --- | --- | --- | --- | --- | --- | --- |
| | Al$_2$O$_3$ | TiN | Zr | ZrC | ZrN | | | | | |
| 1 | 94 | 5 | | 1 | | 99.0 | 89.4 | 1.9 | 0.15 | claimed in the present invention |
| 2 | 88 | 10 | | 2 | | 98.9 | 90.5 | 1.6 | 0.13 | claimed in the present invention |
| 3 | 88 | 10 | 2 | | | 99.2 | 89.9 | 1.4 | 0.12 | claimed in the present invention |
| 4 | 81 | 15 | | 4 | | 98.7 | 90.7 | 1.5 | 0.13 | claimed in the present invention |
| 5 | 81 | 15 | | | 4 | 98.5 | 89.8 | 1.7 | 0.15 | claimed in the present invention |
| 6 | 81 | 15 | | 2 | 2 | 98.8 | 90.1 | 1.4 | 0.17 | claimed in the present invention |
| 7 | 90 | 9.5 | | 0.5 | | 98.7 | 89.7 | 1.9 | 0.15 | claimed in the present invention |
| 8 | 78 | 17 | | 5 | | 96.3 | 87.1 | 2.2 | 0.26 | not claimed |
| 9 | 96 | 3 | | 1 | | 98.8 | 87.9 | 3.9 | 0.31 | not claimed |
| 10 | 84 | 6 | | 10 | | 93.0 | 84.0 | 4.8 | 0.53 | not claimed |
| 11 | 84 | 10 | | 6 | | 96.8 | 87.0 | 3.2 | 0.35 | not claimed |
| 12 | 88 | 10 | 2 | | | 99.5 | 90.5 | 1.5 | 0.12 | not claimed*[2] |
| 13 | 81 | 15 | | 4 | | 99.2 | 90.8 | 1.2 | 0.15 | not claimed*[3] |
| 14 | 88 | 12 | | | | 99.2 | 88.7 | 2.6 | 0.22 | not claimed*[4] |
| 15 | 81 | 19 | | | | 99.0 | 88.9 | 2.4 | 0.25 | not claimed*[4] |

Remarks:
*[1]Flank abrasion depth after cutting of 100 teeth
Cutting test condition
Tested material: cast iron FC20, rod having 120mm diameter × 400mm length and circumferentially extending teeth with 15mm wide crests axially arranged with 5mm wide gap intervals
Cutting speed: 920m/min
Feed: 0.25mm/rev.
Depth of cut: 0.5mm
Number of cut teeth: 100
*[2]hot pressed sample No. 3
*[3]hot pressed sample No. 4
*[4]hot pressed

We claim:

1. Vacuum-sintered ceramics having a mean alumina grain size of not exceeding 2 microns and a relative apparent density of not less than 98.5% of theoretical density for cutting tools obtained by sintering a pressed mixture substantially consisting of 80-95% by volume of alumina and the balance of titanium nitride and one or more zirconium-containing components selected from the group consisting of zirconium, zirconium carbide and zirconium nitride, wherein the volumetric ratio of titanium nitride/zirconium-containing component(s) ranges between 95/5 and 50/50, inclusively, under vacuum or vacuum inert atmosphere without applying pressure on said pressed mixture.

2. The sintered ceramics of claim 1 wherein the resultant zirconium-containing component(s) is partly present as lower oxide of zirconium due to the sintering.

3. The sintered ceramics of claim 1 wherein the starting titanium nitride comprises not less than about 75% by weight of titanium and not less than about 20% by weight of nitrogen.

4. The sintered ceramics of claim 1 wherein the starting zirconium carbide comprises not less than about 11.3% by weight of carbon.

5. The sintered ceramics of claim 1 wherein the starting zirconium nitride comprises not less than about 13.0% by weight of nitrogen.

6. The sintered ceramics of claim 1 wherein the starting zirconium has a purity of not less than about 98% by weight.

7. The sintered ceramics of claim 1 wherein the starting mixture further comprises one or more selected from the group consisting of 0–1.0% by volume of magnesium oxide, 0–0.6% by volume of calcium oxide and 0–0.6% by volume of yttrium oxide.

8. The sintered ceramics of claim 1 being obtained by sintering at a temperature approximately ranging from 1500° to 1700° C.

9. The sintered ceramics of claim 1 wherein said mixture is sintered in the vacuum and/or in the vacuum inert atmosphere.

10. The sintered ceramics of claim 1 wherein said mixture is sintered in the vacuum of not exceeding about $1 \times 10^{-1}$ Torr.

11. The sintered ceramics of claim 1 wherein said mixture is sintered in the vacuum inert atmosphere of not exceeding about 200 Torr substantially consisting of argon, helium or a mixture thereof.

12. The sintered ceramics of claim 1 wherein said mixture is heated up to about 1300° C.–1350° C. in the vacuum then sintered at a higher temperature up to 1700° C. in the vacuum inert atmosphere.

13. A process of producing sintered ceramics for cutting tools which comprises a step of mixing organic binder and optionally diluent with a starting mixture comprising a major part of alumina and a minor part of titanium nitride, a step of cold pressing the resultant mixture into a pressed body then a step of sintering the pressed body so that the mean alumina crystal grain size in the sintered product does not exceed about 2 microns, wherein the improvement comprises:

that the starting mixture substantially consists of 80–95% by volume of alumina and the balance of titanium nitride and one or more zirconium-containing components selected from a group consisting of zirconium, zirconium carbide and zirconium nitride wherein the volumetric ratio of titanium nitride/zirconium-containing component(s) ranges between 95/5 and 50/50, inclusively, and that the pressed body is sintered in the vacuum and/or in the vacuum inert atmosphere without applying pressure on the pressed body.

14. The process of claim 13 wherein the sintering step is carried out at a temperature approximately ranging from 1500° to 1700° C.

15. The process of claim 13 wherein the sintering step is carried out at a temperature approximately ranging from 1550° to 1650° C.

16. The process of claim 14 wherein the sintering step is carried out in the vacuum of not exceeding around $1 \times 10^{-1}$ Torr.

17. The process of claim 14 wherein the sintering step is carried out in the vacuum of approximately $10^{-2}$–$10^{-3}$ Torr.

18. The process of claim 14 wherein the sintering step is carried out in the vacuum inert atmosphere substantially consisting of argon, helium or a mixture thereof.

19. The process of claim 14 wherein the sintering step is carried out in the vacuum inert atmosphere of not exceeding around 200 Torr.

20. The process of claim 14 wherein the sintering step is carried out in the vacuum inert atmosphere of approximately 50–100 Torr substantially consisting of argon, helium or a mixture thereof.

21. The process of claim 13 wherein the sintering step is carried out in two steps, the first step being heating in the vacuum up to about 1300° C.–1350° C., the second step being sintering in the vacuum at a higher temperature up to 1700° C.

22. The process of claim 21 wherein the first step heating is carried out in the vacuum of approximately $1 \times 10^{-1}$–$1 \times 10^{-3}$ Torr and the second step sintering is carried out in the vacuum inert atmosphere of not exceeding around 200 Torr.

23. The process of claim 13 wherein the starting alumina is substantially α-alumina having a purity of not less than about 99.9% by weight and has a means particle size of not exceeding about $1\mu$.

24. The process of claim 13 wherein the starting titanium nitride comprises not less than about 75% by weight of titanium and not less than about 20% by weight of nitrogen and has a mean particle size of not exceeding about $3\mu$.

25. The process of claim 13 wherein the starting zirconium carbide comprises not less than 11.3% by weight of carbon and has a means particle size of not exceeding about $3\mu$.

26. The process of claim 13 wherein the starting zirconium nitride comprises not less than about 13.0% by weight of nitrogen and has a mean particle size of not exceeding about $5\mu$.

27. The process of claim 13 wherein the starting zirconium has a purity of not less than 98% by weight and a mean particle size of not exceeding about $6\mu$.

28. The process of claim 13 wherein the organic binder and diluent are capable of burning-off or volatile.

29. The process of claim 13 wherein the organic binder is camphor, the diluent being ether.

30. The process of claim 13 wherein the starting mixture further comprises one or more selected from the group consisting of 0–1.0% by volume of magnesium oxide, 0–0.6% by volume of calcium oxide and 0–0.6% by volume of yttrium oxide.

* * * * *